(12) United States Patent
Fujii et al.

(10) Patent No.: US 12,051,013 B2
(45) Date of Patent: *Jul. 30, 2024

(54) LEARNING DEVICE, LEARNING METHOD, AND PROGRAM THEREFOR FOR SHORTEN TIME IN GENERATING APPROPRIATE TEACHER DATA

(71) Applicant: OMRON Corporation, Kyoto (JP)

(72) Inventors: Takashi Fujii, Kyoto (JP); Yuki Ueyama, Kyoto (JP); Yasuaki Abe, Takatsuki (JP); Nobuyuki Sakatani, Otsu (JP); Kazuhiko Imatake, Osaka (JP)

(73) Assignee: OMRON Corporation, Kyoto (JP)

( * ) Notice: Subject to any disclaimer, the term of this patent is extended or adjusted under 35 U.S.C. 154(b) by 1025 days.

This patent is subject to a terminal disclaimer.

(21) Appl. No.: 16/968,606

(22) PCT Filed: Mar. 5, 2019

(86) PCT No.: PCT/JP2019/008649
§ 371 (c)(1),
(2) Date: Aug. 10, 2020

(87) PCT Pub. No.: WO2019/176655
PCT Pub. Date: Sep. 19, 2019

(65) Prior Publication Data
US 2020/0372413 A1    Nov. 26, 2020

(30) Foreign Application Priority Data
Mar. 15, 2018  (JP) ................. 2018-047856

(51) Int. Cl.
*G06N 7/04* (2006.01)
*B25J 9/16* (2006.01)
(Continued)

(52) U.S. Cl.
CPC .............. *G06N 7/046* (2013.01); *B25J 9/161* (2013.01); *B25J 9/163* (2013.01); *B25J 15/02* (2013.01);
(Continued)

(58) Field of Classification Search
CPC ........... B25J 9/163; B25J 15/02; G06N 20/00; G06N 3/08; G06N 3/06; G06N 7/04;
(Continued)

(56) References Cited

U.S. PATENT DOCUMENTS 5,406,474 A    4/1995  Hansen
5,909,676 A *  6/1999  Kano .................. G06N 3/08
                                                    706/15
(Continued)

FOREIGN PATENT DOCUMENTS

CN    101807048    8/2010
JP    2005211928   8/2005
(Continued)

OTHER PUBLICATIONS

Dehghani et al., "Avoiding Your Teacher's Mistakes: Training Neural Networks with Controlled Weak Supervision" Dec. 7, 2017, arXiv: 1711.00313v2, pp. 1-13. (Year: 2017).*

(Continued)

*Primary Examiner* — Miranda M Huang
*Assistant Examiner* — Chase P. Hinckley
(74) *Attorney, Agent, or Firm* — JCIPRNET

(57) ABSTRACT

This learning device provides a learned model to an adjuster including the learned model learned to output a predetermined compensation amount to a controller based on parameters of an object to be processed, in a system including the controller outputting a command value obtained by compensating a target value based on a compensation amount; and a control object performing a predetermined process on
(Continued)

the object and outputting a control variable as a response to the command value. The learning device includes: a learning part generating candidate compensation amounts based on operation data including a target value, command value and control variable, learning with the generated candidate compensation amounts and the parameters of the object as teacher data, and generating or updating the learned model; and a setting part providing, to the adjuster, the generated or updated learned model.

7 Claims, 7 Drawing Sheets

(51) Int. Cl.
*B25J 15/02* (2006.01)
*G05B 13/02* (2006.01)
*G06N 3/06* (2006.01)
*G06N 3/08* (2023.01)
*G06N 20/00* (2019.01)

(52) U.S. Cl.
CPC .......... *G05B 13/0265* (2013.01); *G06N 3/06* (2013.01); *G06N 3/08* (2013.01); *G06N 7/04* (2013.01); *G06N 20/00* (2019.01); *G05B 2219/39284* (2013.01)

(58) Field of Classification Search
CPC .... G06N 7/046; G05B 13/0265; G05B 13/02; G05B 2219/33034; G05B 2219/34082; G05B 2219/39284
See application file for complete search history.

(56) References Cited

U.S. PATENT DOCUMENTS

| | | | | |
|---|---|---|---|---|
| 10,126,718 | B2* | 11/2018 | Namie | G05B 13/048 |
| 2017/0255177 | A1* | 9/2017 | Tokuda | G05B 17/02 |
| 2017/0259433 | A1* | 9/2017 | Takeuchi | B25J 13/085 |
| 2018/0169856 | A1* | 6/2018 | Murakami | B25J 9/163 |
| 2018/0181089 | A1* | 6/2018 | Fuji | G05B 13/042 |
| 2018/0222057 | A1* | 8/2018 | Mizobe | B25J 9/161 |
| 2018/0284703 | A1* | 10/2018 | Sonoda | G05B 6/02 |
| 2019/0028043 | A1* | 1/2019 | Oho | H02P 21/08 |
| 2019/0213474 | A1* | 7/2019 | Lin | G06N 3/084 |
| 2019/0240843 | A1* | 8/2019 | Pan | B25J 9/1653 |
| 2019/0294930 | A1* | 9/2019 | Koike | G06N 3/08 |
| 2020/0114506 | A1* | 4/2020 | Toshev | G06N 3/008 |

FOREIGN PATENT DOCUMENTS

| | | | |
|---|---|---|---|
| JP | 2015018388 | 1/2015 | |
| JP | 2017068658 | 4/2017 | |
| WO | 2017094424 | 6/2017 | |
| WO | WO-2018116851 A1 * | 6/2018 | ............. G01N 21/64 |

OTHER PUBLICATIONS

Ma et al., "Teacher Improves Learning by Selecting a Training Subset" Feb. 25, 2018, arXiv: 1802.08946v1, pp. 1-14. (Year: 2018).*
Fachantidis et al., "Learning to Teach Reinforcement Learning Agents" Jul. 28, 2017, arXiv: 1707.09079, pp. 1-13. (Year: 2017).*
Sadgehi et al., "Sim2Real View Invariant Visual Servoing by Recurrent Control" Dec. 20, 2017, arXiv: 1712.07642v1, pp. 1-11. (Year: 2017).*
Bateux et al., "Visual Servoing from Deep Neural Networks" Jun. 7, 2017, arXiv: 1705.08940v2, pp. 1-6. (Year: 2017).*
Lee et al., "Learning Visual Servoing with Deep Features and Fitted Q-Iteration" Jul. 11, 2017, arXiv: 1703.11000v2, pp. 1-20. (Year: 2017).*
Shiro Masuda et al., "PID controller tuning based on disturbance attenuation FRIT using one-shot experimental data due to a load change disturbance," IFAC Proceedings vols. vol. 45, Jan. 2012, pp. 92-97.
"Search Report of Europe Counterpart Application", issued on Nov. 5, 2021, p. 1-p. 12.
"Office Action of China Counterpart Application" with English translation thereof, issued on Jun. 29, 2022, p. 1-p. 25.
"International Search Report (Form PCT/ISA/210) of PCT/JP2019/008649", mailed on May 7, 2019, with English translation thereof, pp. 1-4.
"Written Opinion of the International Searching Authority (Form PCT/ISA/237) of PCT/JP2019/008649", mailed on May 7, 2019, with English translation thereof, pp. 1-8.

* cited by examiner

| | IN (hardness) | OUT (optimal compensation amount) | Quality evaluation |
|---|---|---|---|
| Object to be processed No. 1 (known) | 3 | 0.5[mm] | OK |
| Object to be processed No. 2 (known) | 5 | 4.0[mm] | OK |
| Object to be processed No. 3 (known) | 10 | 12.0[mm] | OK |
| Object to be processed No. 4 (unknown) | 11 | ρ* | Not performed |

FIG. 3

LEARNING DEVICE, LEARNING METHOD, AND PROGRAM THEREFOR FOR SHORTEN TIME IN GENERATING APPROPRIATE TEACHER DATA

CROSS-REFERENCE TO RELATED APPLICATION

This application is a 371 application of the International PCT application serial no. PCT/JP2019/008649, filed on Mar. 5, 2019, which claims the priority benefits of Japan Patent Application No. 2018-047856, filed on Mar. 15, 2018. The entirety of each of the above-mentioned patent applications is hereby incorporated by reference herein and made a part of this specification.

BACKGROUND

Technical Field

The disclosure relates to a learning device, a learning method, and a program therefor.

Description of Related Art

When a material is processed and assembled by a control device such as a press machine, normally, the material cannot be restored once processed. Therefore, it is not possible to appropriately adjust the control variable while repeatedly processing the same material. Therefore, it is important to quantify the relationship between the material properties and the control input, to impart an appropriate control input when performing new processing, etc., and to obtain an appropriate control variable.

For example, Patent Document 1 discloses a press system capable of reducing the influence of variations in plate thickness when manufacturing a pressed product. The press system of Patent Document 1 includes a press machine, a plate thickness acquisition means which includes a supply device for supplying a workpiece to the press machine and which acquires the plate thickness information of the workpiece before press is performed by the press machine, and a die height setting means which sets the die height (H) of the press machine based on the plate thickness information from the plate thickness acquisition means.

RELATED ART

Patent Document

[Patent Document 1] Japanese Laid-open No. 2005-211928

SUMMARY

Technical Problem

Incidentally, in the press system described in Patent Document 1, it is necessary to adjust the optimal die height to be set by performing trial and error for multiple times by an actual press machine for every assumed plate thickness. Further, in a control system that actually performs processing, assembly and the like on an object to be processed of a press machine and the like, the appropriate value of the control variable such as the die height is not limited to being affected by the plate thickness but may be affected by various parameters related to the object to be processed, such as the hardness, temperature and material of to the object to be processed. It takes a huge amount of time to actually adjust the compensation amount to obtain an appropriate control variable by trial and error for multiple times with respect to all combinations of various parameters.

Therefore, the disclosure provides a technology for efficiently learning an appropriate compensation amount for generating a command value to be imparted to a control object in predictive control of a control system which performs processing, assembly and the like of an object to be processed.

Solution to the Problem

A learning device according to an aspect of the disclosure is a learning device in a control system which includes: a controller which outputs a command value obtained by compensating a target value based on a compensation amount; and a control object controlled to perform a predetermined process on an object to be processed, wherein a command value output by the controller is input to the control object, and the control object outputs a control variable as a response to the command value. The learning device provides, to an adjuster including a learned model learned to output the predetermined compensation amount to the controller based on a specific parameter of the object to be processed, the learned model. The learning device includes: a learning part which generates a candidate compensation amount based on operation data including the target value, the command value and the control variable, performs learning with the generated candidate compensation amount and the specific parameter of the object to be processed as teacher data, and generates or updates a learned model; and a setting part which provides the learned model that has been generated or updated to the adjuster. According to this aspect, since the learning device generates the candidate compensation amount without actually operating the control object, the learning device may perform learning efficiently without preparing or damaging the object to be processed. Further, the "parameter" includes the characteristic amount and physical amount and other arbitrary numerical information of the object to be processed. The characteristic amount is, for example, a material and the like of the object to be processed, and the physical amount is, for example, hardness, temperature or the like of the object to be processed.

According to the above configuration, the learning part may generate the candidate compensation amount by data-driven control. At this time, the data-driven control may be any one of virtual reference feedback tuning (VRFT), fictitious reference iterative tuning (FRIT), and estimated response iterative tuning (ERIT). According to this aspect, by using a data-driven control method such as VRFT, FRIT, or ERIT, the learning part may generate the candidate compensation amount without obtaining the dynamic characteristic model of the control object and may generate the teacher data. In this way, the learning device may generate the candidate compensation amount without repeating the actual operations of the control object. As a result, the learning device may perform learning more efficiently without preparing or damaging the object to be processed.

Further, the learning part may be configured to adopt the candidate compensation amount as the teacher data when the generated candidate compensation amount is not a value deviating by a predetermined threshold value or more from a candidate compensation amount included in teacher data used by the learned model for learning, or when the generated candidate compensation amount is in the range of a candidate compensation amount included in teacher data used by the learned model for learning. In this way, it is possible to prevent unnecessary learning when the candidate compensation amount generated by the learning part is inappropriate.

Further, the learning device may be configured to further include an evaluation part which obtains operation data including a control variable when a command value obtained by compensating a target value based on a compensation amount output by the learned model is imparted to the control object to evaluate the quality of the control variable, and the learning part may be configured to perform the learning when the evaluation of the quality is not in an allowable range. Further, the learning part may be configured to perform the learning when the specific parameter of the object to be processed is a value deviating by a predetermined threshold value or more from a parameter already learned as the teacher data. In this way, it is possible to prevent the learning part from performing unnecessary learning for the object to be processed that may be handled by the current learned model.

A learning method according to an aspect of the disclosure is a learning method executed in a learning device in a control system which includes: a controller which outputs a command value obtained by compensating a target value based on a compensation amount; and a control object controlled to perform a predetermined process on an object to be processed, wherein a command value output by the controller is input to the control object, and the control object outputs a control variable as a response to the command value. The learning device provides, to an adjuster including a learned model learned to output the predetermined compensation amount to the controller based on a specific parameter of the object to be processed, the learned model. The learning method is executed to make the learning device perform: generating a candidate compensation amount based on operation data including the target value, the command value and the control variable, performing learning with the generated candidate compensation amount and the specific parameter of the object to be processed as teacher data, and generating or updating a learned model; and providing the learned model that has been generated or updated to the adjuster.

A program according to an aspect of the disclosure is a program for operating a learning device in a control system which includes: a controller which outputs a command value obtained by compensating a target value based on a compensation amount; and a control object controlled to perform a predetermined process on an object to be processed, wherein a command value output by the controller is input to the control object, and the control object outputs a control variable as a response to the command value. The learning device provides, to an adjuster including a learned model learned to output the predetermined compensation amount to the controller based on a specific parameter of the object to be processed, the learned model. The program operates the learning device to perform: a part for generating a candidate compensation amount based on operation data including the target value, the command value and the control variable, performing learning with the generated candidate compensation amount and the specific parameter of the object to be processed as teacher data, and generating or updating a learned model; and a part for providing the learned model that has been generated or updated to the adjuster.

Effects

According to the disclosure, it is possible to provide a technology for efficiently learning an appropriate compensation amount for generating a command value to be imparted to a control object in predictive control of a control system which performs processing, assembly and the like of an object to be processed.

BRIEF DESCRIPTION OF THE DRAWINGS

FIG. 3 is a diagram showing an example of the management table according to an embodiment of the disclosure.

DESCRIPTION OF THE EMBODIMENTS

Embodiment

Hereinafter, embodiments according to one aspect of the disclosure (hereinafter also referred to as "the embodiments") will be described with reference to the drawings. However, the embodiments described below are merely examples of the disclosure in all respects. It goes without saying that various improvements and modifications can be made without departing from the scope of the disclosure. That is, in implementing the disclosure, a specific configuration according to the embodiments may be appropriately adopted. Further, although the data that appears in the embodiments is described in natural language, more specifically, it is specified by a computer-recognizable pseudo language, command, parameter, machine language, or the like.

§ 1 APPLICATION EXAMPLE

Figure 1:
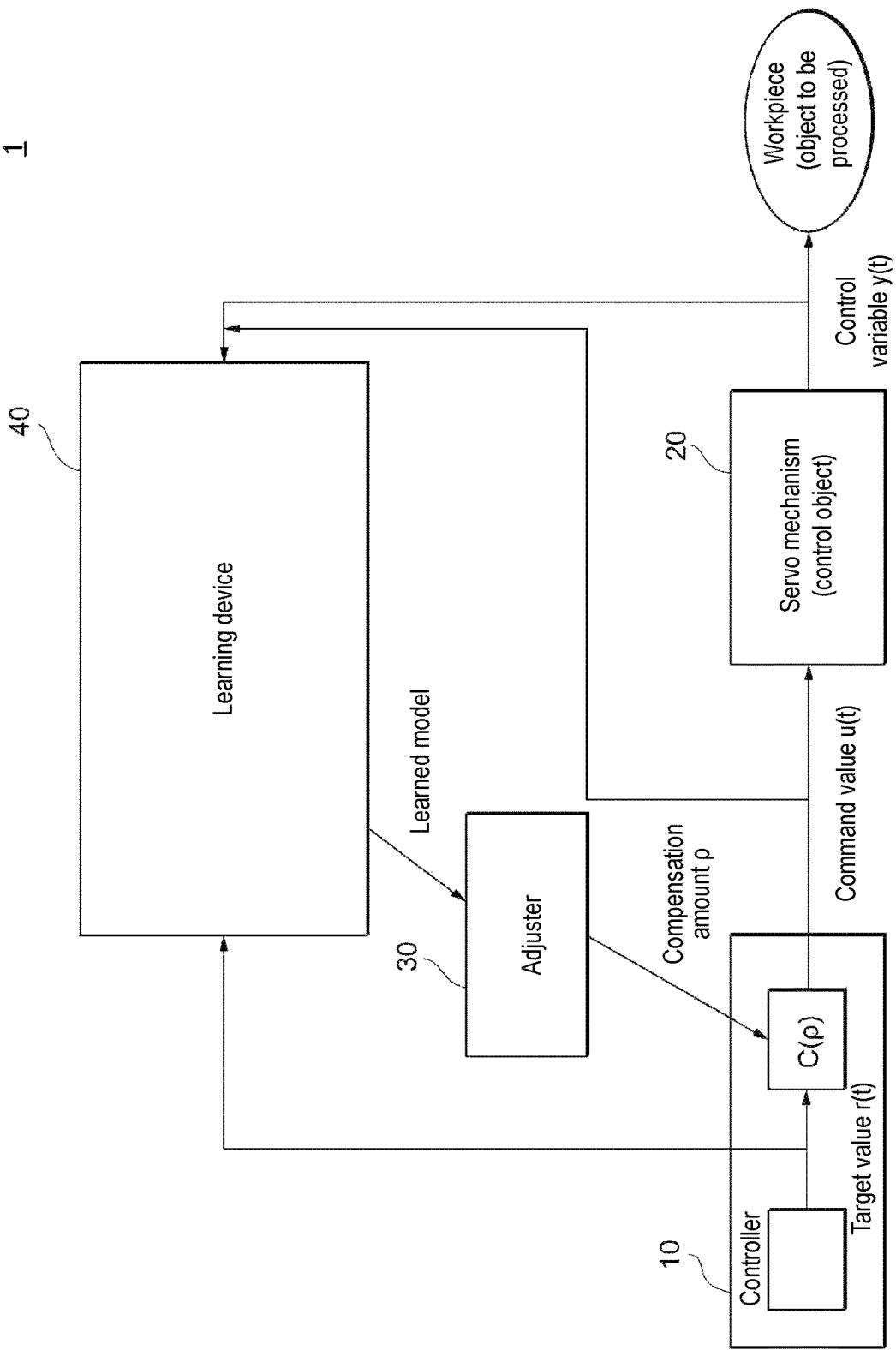
FIG. 1 is a schematic diagram showing a system configuration example of a control system according to an embodiment of the disclosure.

First, an exemplary scenario where the disclosure is used is described with reference to FIG. 1. FIG. 1 is a diagram showing an example of the configuration of a control system 1 according to the disclosure. The control system 1 includes a controller 10, a servo mechanism 20, an adjuster 30, and a learning device 40.

The controller 10 generates a command value u(t) obtained by compensating a target value r(t) based on a compensation amount p output by the adjuster 30, and outputs the command value u(t) to the servo mechanism 20. The target value r(t) may be generated (the case of using a stored target value is included) by the controller 10 or may be imparted to the controller 10 from the outside. When the transfer function of the controller 10 is set to $C(\rho)$, the controller 10 generates the command value u by performing the calculation shown in the following Equation (1).

<Calculation Formula of Controller>

$$u(t)=C(\rho) \times r(t) \qquad \text{Equation (1)}$$

The servo mechanism 20 is controlled by the controller 10 to perform a predetermined process on an object to be processed (hereinafter also referred to as a "workpiece"). The command value u(t) is imparted from the controller 10 to the servo mechanism 20, and a control variable y(t) is output as a response to the input value. When the transfer function of the servo mechanism 20 is set to P, the control variable y(t) is expressed by the following Equation (2).

<Calculation Formula of Servo Mechanism>

$$y(t)=P \times u(t) \quad \text{Equation (2)}$$

Further, in the embodiment, the servo mechanism 20 is an example of a press machine that presses a workpiece with a predetermined amount of pressure, but the disclosure is not limited thereto. Further, the servo mechanism 20 is an example of the "control object" in the disclosure.

The adjuster 30 outputs the compensation amount ρ to be imparted to the controller 10. In the embodiment, the adjuster 30 has a learned model learned so that an appropriate compensation amount is output based on a specific parameter among the parameters of the workpiece. For example, the plate thickness of the workpiece may be used as the specific parameter. The learned model may be provided by the learning device 40. Moreover, the adjuster 30 may obtain the parameters of the workpiece from a sensor (not shown). Further, the sensor may be included in the servo mechanism 20, for example.

When generating the learned model, the learning device 40 first actually operates the control system once with respect to the object to be processed which has a certain parameter α, and then obtains the relationship between the target value r(t), the command value u(t) and the control variable y(t) at this time. Next, the learning device 40 calculates a candidate compensation amount ρ* corresponding to the parameter α from these three values. The learning device 40 generates teacher data based on the calculated candidate compensation amount ρ* and the parameter α. By performing this process on multiple parameters, the learning device 40 may generate multiple pieces of teacher data having each parameter and a candidate compensation amount corresponding thereto. Then, the learning device 40 generates a learned model by performing learning with the generated one or more pieces of teacher data. In addition, whether the generated teacher data is actually used for learning may be determined based on a predetermined adoption criterion.

In generating the candidate compensation amount ρ*, the learning device 40 may use a data-driven control method such as virtual reference feedback tuning (VRFT), fictitious reference iterative tuning (FRIT), estimated response iterative tuning (ERIT), or the like. In the data-driven control, the control parameter may be set by using the obtained data without obtaining the dynamic characteristic model of the control object (the servo mechanism 20 in this embodiment). By using the data-driven control method, the candidate compensation amount ρ* is generated from a set of operation data without performing repeated experiments, that is, without repeating the actual operations of the servo mechanism 20, and it is used as the teacher data. In this way, it is possible to shorten the time required to generate appropriate teacher data and to efficiently generate a learned model for outputting an appropriate compensation amount. As a result, the learning device may perform learning more efficiently without preparing or damaging the object to be processed.

§ 2 CONFIGURATION EXAMPLE

Figure 4:
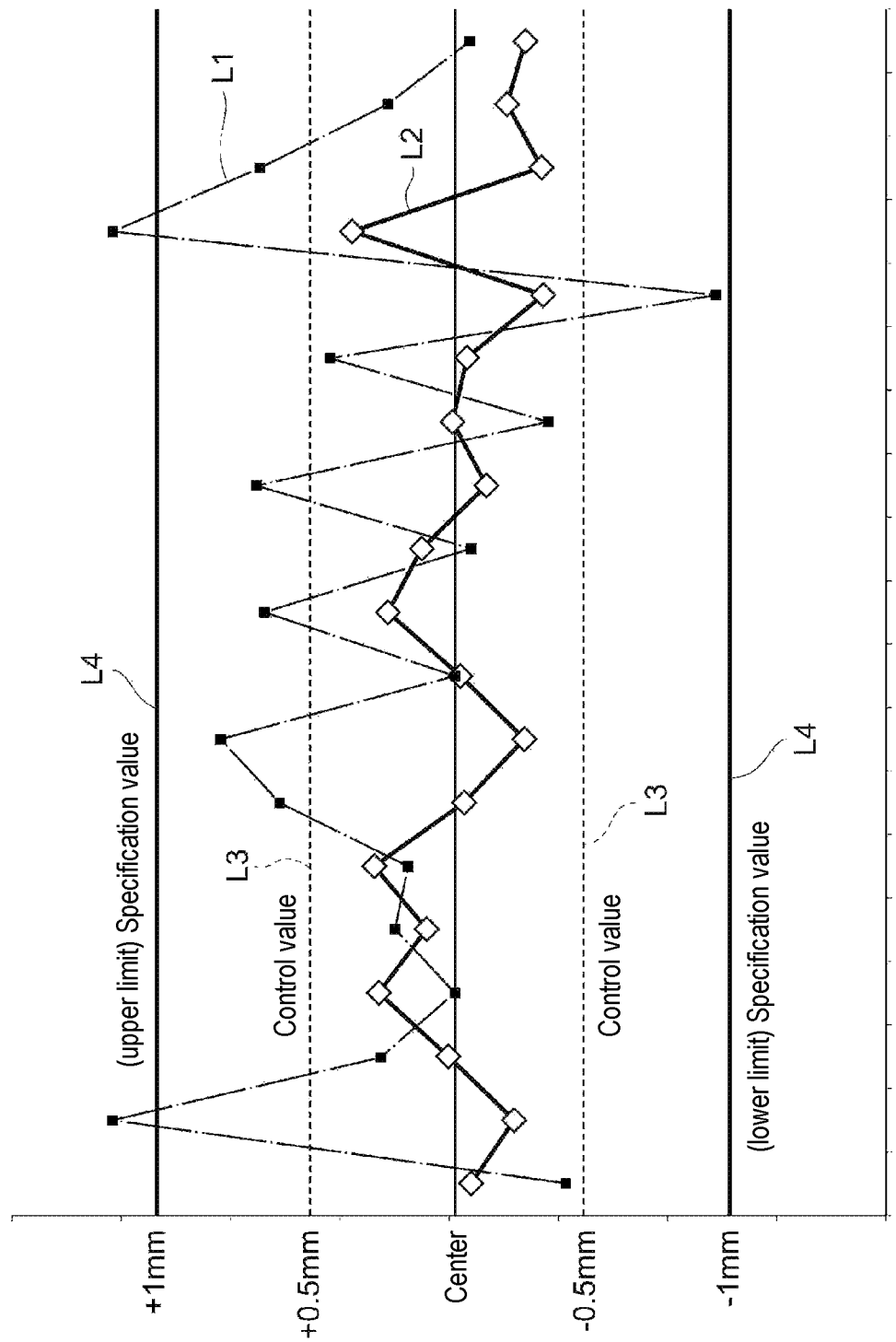
FIG. 4 is a diagram showing an example of a control chart according to an embodiment of the disclosure.

An example of the functional configuration of the learning device 40 will be described with reference to FIGS. 2 to 4.

Figure 2:
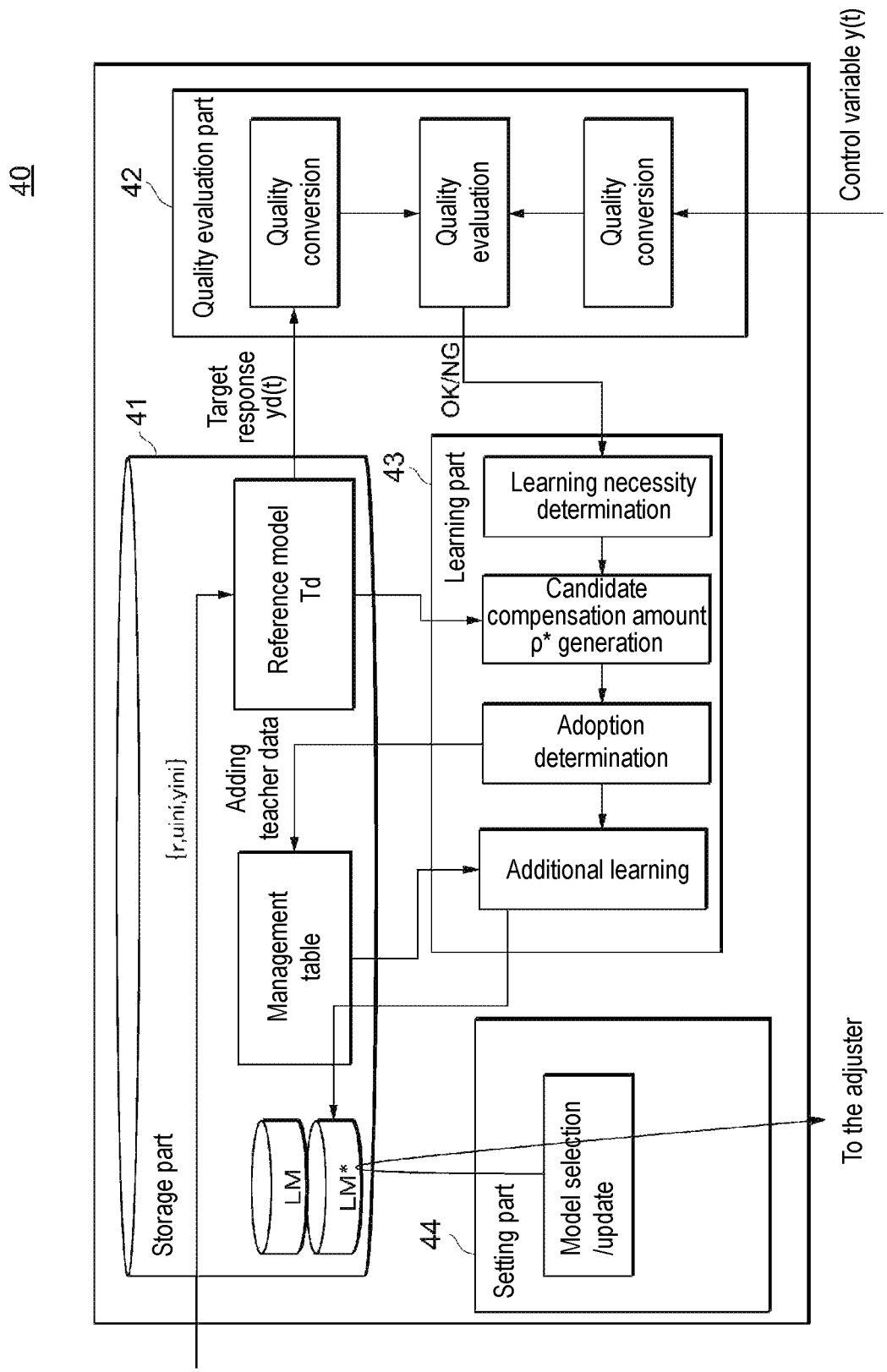
FIG. 2 is a block diagram showing a functional configuration example of the learning device according to an embodiment of the disclosure.

FIG. 2 is a functional block diagram showing an example of the functional configuration of the learning device 40. As shown in FIG. 2, the learning device 40 includes a storage part 41, a quality evaluation part 42, a learning part 43, and a setting part 44.

The storage part 41 stores a reference model Td and a management table.

The reference model Td represents the transfer function of the ideal response of the control variable y(t) for the target value r(t). When the reference model Td is used, an ideal control variable (hereinafter also referred to as a "target response") yd(t) for the target value r(t) is expressed by the following Equation (3).

<Formula of Reference Model Td>

$$yd(t)=Td \times r(t) \quad \text{Equation (3)}$$

Further, the reference model Td is not limited to the transfer function, and a model generated by machine learning based on the target value r(t) and the control variable y(t) when the servo mechanism 20 is operated without a workpiece may be used.

The management table manages the teacher data used by the learning part 43 for learning. FIG. 3 is a diagram showing an example of the management table. The teacher data is data in which, for each workpiece, a specific parameter (hardness in the example of FIG. 3) of the workpiece serving as input data and an optimal compensation amount (hereinafter also referred to as an "optimal compensation amount") for the workpiece when a command value is output serving as output data are associated with each other. The evaluation result (hereinafter also referred to as "quality evaluation") of the control variable output by the servo mechanism 20 in response to the command value generated based on the optimal compensation amount associated with each workpiece is associated in the management table.

In addition, after a record of the new teacher data is added to the management table, if the servo mechanism 20 has not yet processed the workpiece corresponding to the record, for example, "not performed" may be registered in the evaluation result column of the management table.

In this way, the management table manages the teacher data used by the learning part 43 for learning and the evaluation results of the learned model newly generated (or updated) with the teacher data. The evaluation result of the learned model is an index indicating whether the optimal compensation amount included in the teacher data of the corresponding record is appropriate. More specifically, regarding the optimal compensation amount in the record newly added as the teacher data, the evaluation result is an index indicating whether the control variable output as a response when the command value generated based on the optimal compensation amount is input to the servo mechanism 20 is within a predetermined allowable range.

Further, the storage part 41 stores the learned model LM generated by the learning part 43. It is preferable that the storage part 41 stores multiple generations of the learned model generated by the learning part 43.

The quality evaluation part 42 obtains operation data from the controller 10 and the servo mechanism 20 to evaluate the quality of the control variable. A case will be described as an example in which the control variable y(t) is output by the servo mechanism 20 as a response to the command value u(t) imparted for the target value r(t). At this time, the quality evaluation part 42 inputs the target value r(t) into the reference model Td and obtains a target response yd(t) for the target value r(t).

Next, the quality evaluation part 42 performs quality conversion on the target response yd(t) and the control variable y(t) to calculate quality alternative indices. For example, the quality evaluation part 42 performs quality conversion on the target response yd(t) and the control variable y(t) to calculate the bottom dead center position and settling time. More specifically, the quality evaluation part 42 calculates the bottom dead center position from the maximum values of the target response yd(t) and the control variable y(t). Further, the quality evaluation part 42 subtracts the time when the command value reaches the target position from each of the time when the target response yd(t) enters the target position and the time when the control variable y(t) enters the target position, respectively, whereby the respective settling time is calculated. Further, the bottom dead center position is the position where the stroke length of the servo mechanism 20 is maximized. Further, the settling time is the elapsed time from when the stroke length of the servo mechanism 20 enters the settling width to when it reaches the target position, and the settling width refers to the width within a predetermined range from the target position (e.g., ±10 μm from the target position).

The quality evaluation part 42 performs quality evaluation of the control variable y(t) based on the bottom dead center position and the settling time, which are alternative indices calculated by quality conversion. For example, the quality evaluation part 42 may perform quality evaluation by determining whether the control variable y(t) is within the predetermined allowable range based on whether the bottom dead center position matches the target position or whether the bottom dead center position is included in the settling width.

Further, for example, the quality evaluation part 42 may perform quality evaluation of the control variable y(t) with an $X^{bar}$-R control chart. The $X^{bar}$-R control chart is a control chart for managing changes in average values and changes in variations of the quality evaluation object. FIG. 4 shows an example of an x control chart of the $X^{bar}$-R control chart used in the quality evaluation part 42 for quality evaluation. In FIG. 4, the vertical axis represents the stroke length. The graphs L1 and L2 are examples of plotting average values of the bottom dead center positions in each lot calculated by quality conversion for each control variable y(t) when the servo mechanism 20 processes the workpieces for multiple lots. In FIG. 4, the solid line L4 shows the upper limit and the lower limit of the specification value, and the broken line L3 shows the upper limit and the lower limit of the control value. The specification value is, for example, a request value of a customer who requests processing of the workpieces. The control value is a value for controlling so as not to exceed the specification value. The target value of the quality is shown at the center of the graph. The graph L2 shows an example in which the quality is within the range of the control value, and the graph L1 shows an example in which the quality is not within the specification value. In addition, the example of FIG. 4 shows an example in which a graph is plotted for each lot, but the value of each plot is not limited to the value calculated for each lot, and a value obtained by quality conversion based on the processing for one or more workpieces may be used. In the $X^{bar}$-R control chart shown in FIG. 4, the quality evaluation part 42 may perform quality evaluation by determining whether the control variable y(t) is within the predetermined allowable range based on whether the bottom dead center position of the control variable y(t) is within the range of the control value or within the range of the specification value. For example, the result of quality evaluation by using the $X^{bar}$-R control chart shown in FIG. 4 and the like based on whether the control variable y(t) is within the predetermined allowable range may be registered as the result of the quality evaluation in the management table of FIG. 3 described above. More specifically, for example, when responding to a command value generated based on the optimal candidate compensation amount (0.5 mm in the example of FIG. 3) registered in the record in the first row of FIG. 3, the control variable y(β) is output by the servo mechanism 20. At this time, the result of the quality evaluation of the control variable y(β) based on whether the bottom dead center position of the control variable y(β) is within the range of the control value or within the range of the specification value by using the $X^{bar}$-R control chart shown in FIG. 4 is registered as the result of the quality evaluation in the record in the first row of the management table in FIG. 3.

The learning part 43 generates the teacher data based on the candidate compensation amount ρ* calculated by using the operation data and generates the learned model. The learning part 43 preferably uses the data-driven control such as VRFT, FRIT, and ERIT when calculating the candidate compensation amount ρ*. The data-driven control is a method of setting control parameters by using data without obtaining the dynamic characteristic model of the control object (the servo mechanism 20 in this embodiment). VRFT, FRIT, and ERIT are methods that may specify the compensation amount from a set of operation data without performing repeated experiments. The set of operation data is a target value r, a command value imparted based on the target value, and a control variable output as a response to the command value.

The candidate compensation amount generation process of the learning part 43 will be described in more detail. For example, an example will be described in which the learning part 43 refers to the reference model Td and generates the candidate compensation amount ρ* based on the operation data when the servo mechanism 20 operates on an arbitrary workpiece (hereinafter referred to as the "workpiece X") based on an arbitrary command value uini (hereinafter, the operation data when the operation is performed on the workpiece X based on the arbitrary command value uini is particularly referred to as the "operation data Y"). The command value uini is generated by compensating the target value r based on a certain compensation amount ρini. Here, when the target value included in the operation data Y is set to the target value r, the command value set to the command value uini, and the control variable set to the control variable yini, the operation data Y is expressed by {r, uini, yini}.

When calculating the candidate compensation amount ρ* with VRFT, the learning part 43 first calculates an assumed reference signal by the following Equation (4) with the inverse model $Td^{-1}$ of the reference model Td.

Mathematical Formula 1

$$\bar{\gamma} = Td^{-1} \times yini \qquad \text{Equation (4)}$$

$\bar{\gamma}$: assumed reference signal

Further, the learning part 43 calculates a candidate compensation amount ρ* that minimizes an evaluation function Jv(ρ) expressed by the following Equation (5). Further, in Equation (5), C(ρ) represents the transfer function of the controller 10 described above.

[Mathematical Formula 2]

$$Jv(\rho) = |uini - C(\rho) \times \bar{\gamma}| \qquad \text{Equation (5)}$$

In addition, when calculating the candidate compensation amount ρ* with FRIT, the learning part 43 first calculates a pseudo reference signal by the following Equation (6). Further, in Equation (6), $C(\rho)^{-1}$ represents the inverse transfer function of the controller 10.

[Mathematical Formula 3]

$$\bar{\gamma}(\rho)=C(\rho)^{-1} \times uini \quad \text{Equation (6)}$$

$\bar{\gamma}(\rho)$: pseudo reference signal

Further, the learning part 43 calculates a candidate compensation amount ρ* that minimizes an evaluation function Jf(ρ) expressed by the following Equation (7).

[Mathematical Formula 4]

$$Jf(\rho)=|yini-Td \times \bar{\gamma}(\rho)| \quad \text{Equation (7)}$$

The learning part 43 uses the calculated candidate compensation amount ρ* as the optimal compensation amount ρ', associates it with the parameter of the workpiece X, and adds it to the management table as the teacher data. Further, the learning part 43 may be configured to perform an adoption determination for determining whether to adopt the candidate compensation amount ρ* as the optimal compensation amount ρ'. In this case, the learning part 43 determines whether the calculated candidate compensation amount ρ* satisfies a predetermined adoption criterion, and if so, adopts it as the optimal compensation amount ρ' and adds it to the management table. The adoption criterion is, for example, whether the calculated candidate compensation amount ρ* is not a value (e.g., an outlier) deviating by a predetermined value or more from the optimal compensation amount included in the teacher data registered in the management table. Further, the adoption criterion may be that the candidate compensation amount ρ* is not a value deviating by a certain value or more from the average value of the optimal compensation amount included in the above-described teacher data, or that the candidate compensation amount ρ* is not a value deviating by a certain value or more from the maximum or minimum value of the optimal compensation amount. Further, for example, the adoption criterion may be whether the calculated candidate compensation amount ρ* is included in the range of the optimal compensation amount included in the teacher data registered in the management table.

The learning part 43 performs learning based on the teacher data registered in the management table and generates the learned model LM*. Further, the learning performed when generating the learned model may use, for example, conventional techniques of neural network or regression analysis. The learning part 43 adds the learned model LM* generated currently to the storage part 41 to store it. Further, the learning part 43 may be configured to overwrite the learned model LM stored in the storage part 41 with the learned model LM* generated currently.

Further, the learning part 43 may be configured to perform a learning necessity determination when generating the candidate compensation amount ρ*. In this case, the learning part 43 determines whether a predetermined learning necessity determination criterion is satisfied, and if so, generates the candidate compensation amount ρ* for performing learning. The predetermined learning necessity determination criterion is, for example, whether the evaluation result of the quality evaluation part 42 for the operation data Y is within the allowable range. Further, the predetermined learning necessity determination criterion may be whether the parameter of the workpiece X has been learned in the past, that is, whether the parameter of the workpiece X is outside the range of the learned parameter in the learned model currently set in the adjuster 30. Alternatively, the predetermined learning necessity determination criterion may be whether the external environment of the servo mechanism 20 when the operation is performed on the workpiece X has changed from the previous external environment. In this case, the learning part 43 may detect a change in the external environment based on an arbitrary input by the user, or may obtain image data including the external environment of the servo mechanism 20 from a sensor and detect a change in the external environment based on the obtained image data.

The setting part 44 sets the learned model LM* generated by the learning part 43 in the adjuster 30. At this time, the setting part 44 may evaluate the quality of the learned model LM* before setting the learned model LM*, and may determine whether to set it in the adjuster 30 based on the evaluation result.

The evaluation of the learned model LM* means that, for example, the learning part 43 performs additional learning by using the parameters of the workpiece X and the optimal compensation amount ρ' as the teacher data to newly generate a learned model LM*. At this time, the setting part 44 provides the learned optimal compensation amount ρ' to the controller 10 when the workpiece having the same parameters as the workpiece X is provided to the servo mechanism 20. The controller 10 generates a command value u(x) based on the optimal compensation amount ρ' and outputs it to the servo mechanism 20. The quality evaluation part 42 performs quality evaluation of the control variable y(x) output by the servo mechanism 20 as a response to the command value u(x). According to the result of the quality evaluation, if the control variable y(x) is within the predetermined allowable range, the setting part 44 may set the newly generated learned model LM* in the adjuster 30. On the other hand, when the control variable y(x) is out of the predetermined allowable range, the setting part 44 may be configured to select the learned model LM of one generation earlier and set it in the adjuster 30. In addition, when the quality of the learned model LM* generated this time is out of the predetermined allowable range, and a learned model is already set in the adjuster 30, then the setting part 44 does not have to update the learned model.

Further, if multiple learned models LM* that have not been evaluated yet are registered in the storage part 41, for example, the setting part 44 may evaluate the learned models LM* in the order of new generation, select the learned model LM* whose evaluation result first falls in the allowable range, and set it in the adjuster 30. Further, for example, the setting part 44 may evaluate all the learned models LM*, select the learned model LM* whose evaluation result is the best, and set it in the adjuster 30.

Further, the setting part 44 may delete the learned model LM* whose evaluation is out of the predetermined allowable range from the storage part 41.

In this way, the setting part 44 evaluates the newly generated (or updated) learned model LM* before actually setting it in the adjuster 30, whereby it is possible to prevent the processing accuracy of the control system 1 from being lowered.

§ 3 OPERATION FLOW

Figure 5:
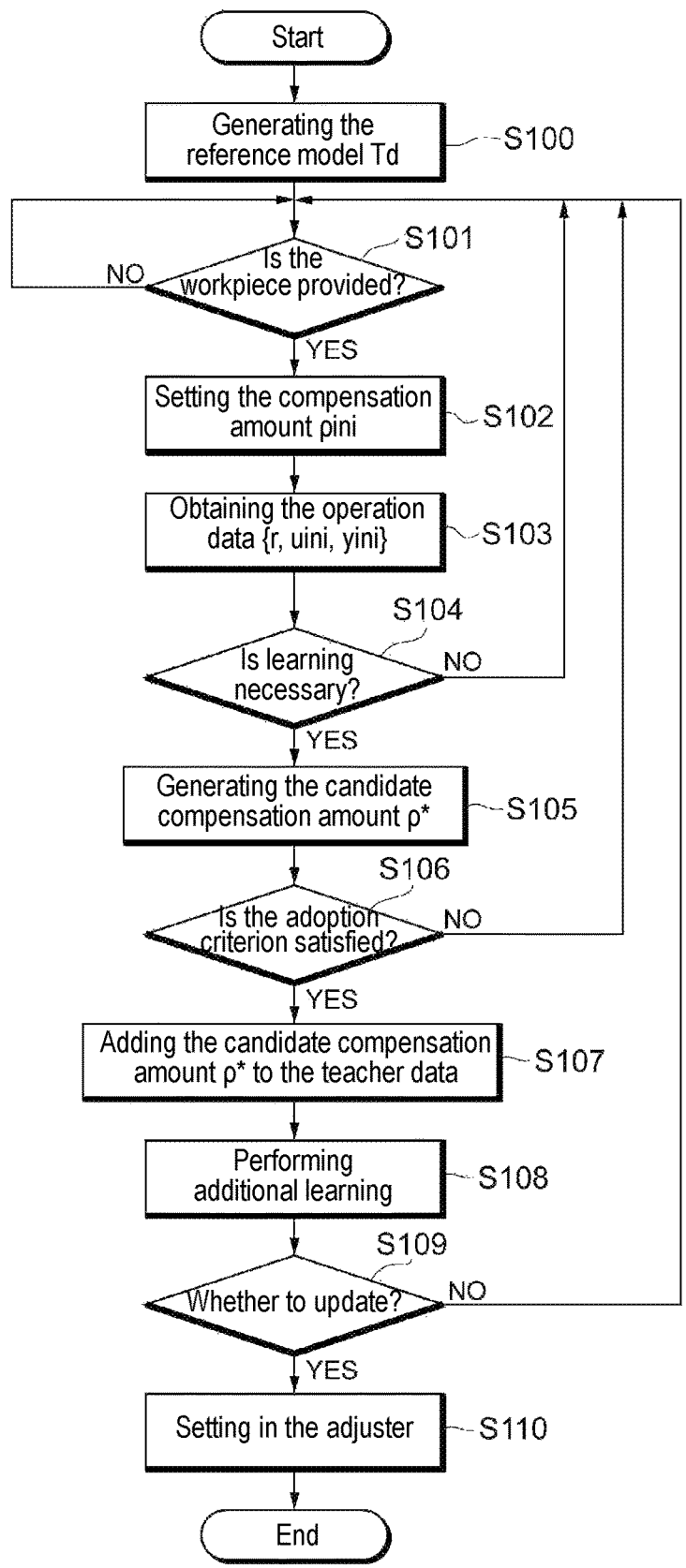
FIG. 5 is a flowchart for illustrating an example of processing of the learning device according to an embodiment of the disclosure.

An example of the processing flow of the control system 1 according to the embodiment will be described with reference to FIG. 5. First, the learning device 40 generates the reference model Td (S100). At this time, the learning device 40 obtains the operation data [r, yd] as the reference. The operation data as the reference may be, for example, the target value r and the control variable y of the servo mechanism 20 when an operation without a workpiece is performed. The learning device 40 generates the reference model Td based on the obtained operation data [r, yd].

Next, when the workpiece is provided (S101: YES), the initial value ρini of the compensation amount for the target value is set (S102). The initial value ρini of the compensation amount may be manually set by the user. In addition, if a learned model has already been set in the adjuster 30, the learned model may be generated.

The controller 10 generates the command value uini based on the set compensation amount ρini and outputs it to the servo mechanism 20. The servo mechanism 20 outputs the control variable yini as a response to the command value uini. The learning device 40 obtains the operation data [r, uini, yini] at this time (S103).

Next, the necessity of learning is determined (S104). For example, the learning part 43 may determine the necessity for the obtained operation data [r, uini, yini] based on the result of the quality evaluation performed by the quality evaluation part 42. Further, the criterion for determining the necessity of learning is not limited thereto, and whether the parameter of the current workpiece is within the range of parameters learned in the past or whether the external environment has changed may be used as the criterion. Further, for example, the necessity of learning may be determined by a person.

When it is determined that learning is unnecessary (S104: NO), the process returns to S101, and the process is performed on the next workpiece. On the other hand, when it is determined that learning is necessary (S104: YES), the learning part 43 refers to the reference model Td and generates the candidate compensation amount $\rho^*$ (S105). The learning part 43 may use a method such as VRFT, FRIT, or ERIT when generating the candidate compensation amount $\rho^*$.

Next, the learning part 43 determines whether to associate the generated candidate compensation amount $\rho^*$ and the parameter of the workpiece provided to the servo mechanism 20 in S102 with each other and to add them as the teacher data (S106). The adoption criterion for determining whether to add is, for example, whether the calculated candidate compensation amount $\rho^*$ is not a value deviating by a predetermined value or more from the compensation amount included in the teacher data registered in the management table. Further, for example, the adoption criterion may be whether the calculated candidate compensation amount $\rho^*$ is included in the range of the compensation amount included in the teacher data registered in the management table.

When it is determined to add (S106: YES), the learning part 43 sets the generated candidate compensation amount $\rho^*$ as the optimal compensation amount ρ', generates a record in association with the parameter of the workpiece provided to the servo mechanism 20 in S102, and adds the record to the management table as the teacher data (S107). On the other hand, when it is determined not to add (S106: NO), the process returns to S101, and the process is performed on the next workpiece. Further, the learning part 43 may also be configured to generate the teacher data and add it to the management table with the generated candidate compensation amount $\rho^*$ as the optimal compensation amount ρ' as it is without performing the determination of S106.

After adding the teacher data, the learning part 43 performs additional learning and newly generates (or updates) a learned model (S108).

Next, the setting part 44 determines whether to set the generated learned model in the adjuster 30 (S109). For example, the setting part 44 may determine whether to set the learned model in the adjuster 30 based on the evaluation result of the quality evaluation part 42 for the control variable when the command value compensated based on the learned optimal compensation amount ρ' is imparted to the servo mechanism 20.

When the quality evaluation is within the predetermined allowable range, the setting part 44 sets the newly generated learned model in the adjuster 30 (S110). On the other hand, if the quality evaluation is out of the allowable range, the process returns to S101, and the process is performed on the next workpiece. Further, the setting part 44 may be configured to set the newly generated learned model in the adjuster 30 as it is without performing the process of S109.

§ 4 ADVANTAGES

In the control system 1 according to the embodiment, the learning device 40 generates the candidate compensation amount based on the operation data including the control variable of the servo mechanism 20 that has processed the object to be processed according to the command value and including the target value and the command value generated by the controller 10. When the generated candidate compensation amount satisfies the predetermined adoption criterion, the learning device 40 adopts the candidate compensation amount as the teacher data and generates a learned model. When generating the candidate compensation amount, the learning device 40 preferably adjusts the compensation amount by a data-driven control method such as VRFT, FRIT, or ERIT without obtaining the dynamic characteristic model of the control object. VRFT, FRIT and ERIT are methods that may specify the compensation amount p from a set of operation data without performing repeated experiments, that is, without repeating the actual operations of the control object. Since the learning device 40 may generate the candidate compensation amount without performing repeated experiments, the learning device 40 may efficiently perform learning without preparing or damaging the object to be processed, and it is possible to shorten the time to generate appropriate teacher data.

§ 5 HARDWARE CONFIGURATION

Next, an example of a hardware configuration when the learning device 40 described above is implemented by a computer 800 will be described with reference to FIG. 6. In addition, the functions of each device may be implemented by being divided into multiple devices.

Figure 6:
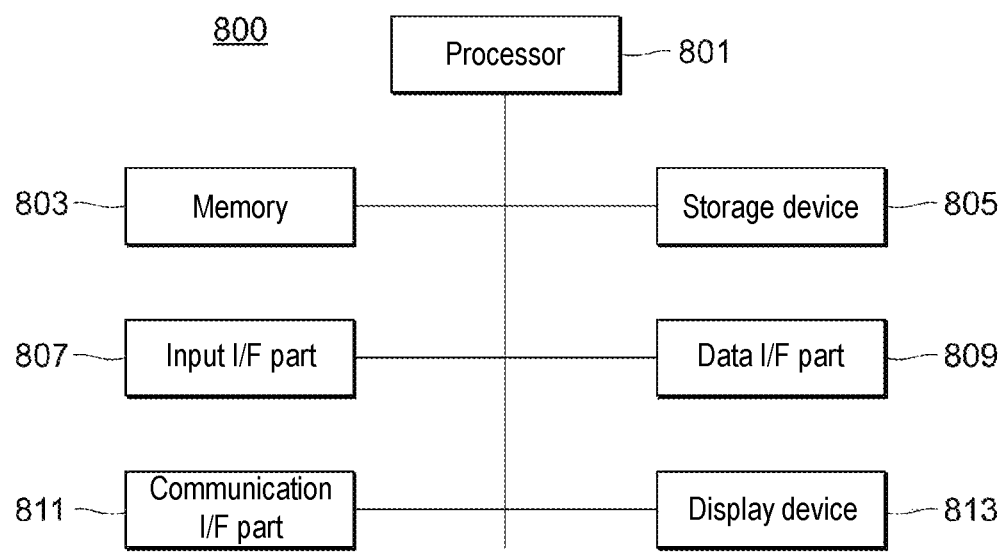
FIG. 6 is a schematic diagram showing a hardware configuration of a learning device according to an embodiment of the disclosure.

As shown in FIG. 6, the computer 800 includes a processor 801, a memory 803, a storage device 805, an input I/F part 807, a data I/F part 809, a communication I/F part 811, and a display device 813.

The processor 801 controls various processes in the computer 800 by executing a program stored in the memory 803. For example, the quality evaluation part 42, the learning part 43, the setting part 44, and the like of the learning device 40 may be implemented as a program which is temporarily stored in the memory 803 and which mainly operates on the processor 801. That is, the functions of the quality evaluation part 42, the learning part 43, and the setting part 44 are implemented by the processor 801 interpreting and executing the program temporarily stored in the memory 803.

The memory 803 is a storage medium such as a random access memory (RAM). The memory 803 temporarily stores the program code of the program executed by the processor 801 and the data required when the program is executed.

The storage device 805 is a non-volatile storage medium such as a hard disk drive (HDD) or a flash memory. The storage device 805 stores an operating system and various programs for implementing each of the above configurations. In addition, the storage device 805 may also store the reference model Td and the management table. Such programs and data are loaded into the memory 803 as needed, and are referred to by the processor 801.

The input I/F part 807 is a device for receiving an input from the user. Specific examples of the input I/F part 807 include a keyboard, a mouse, a touch panel, various sensors, a wearable device, and the like. The input I/F part 807 may be connected to the computer 800 via an interface such as a universal serial bus (USB).

The data I/F part 809 is a device for inputting data from outside the computer 800. Specific examples of the data I/F part 809 include a drive device for reading data stored in various storage media and the like. The data I/F part 809 may be provided outside the computer 800. In this case, the data I/F part 809 is connected to the computer 800 via an interface such as a USB.

The communication I/F part 811 is a device for performing data communication with a device outside the computer 800 via the Internet in a wired or wireless manner. The communication I/F part 811 may be provided outside the computer 800. In this case, the communication I/F part 811 is connected to the computer 800 via an interface such as a USB.

The display device 813 is a device for displaying various information. Specific examples of the display device 813 include a liquid crystal display, an organic electro-luminescence (EL) display, a display of a wearable device, and the like. The display device 813 may be provided outside the computer 800. In this case, the display device 813 is connected to the computer 800 via, for example, a display cable.

§ 6 OTHER EMBODIMENTS

Figure 7:
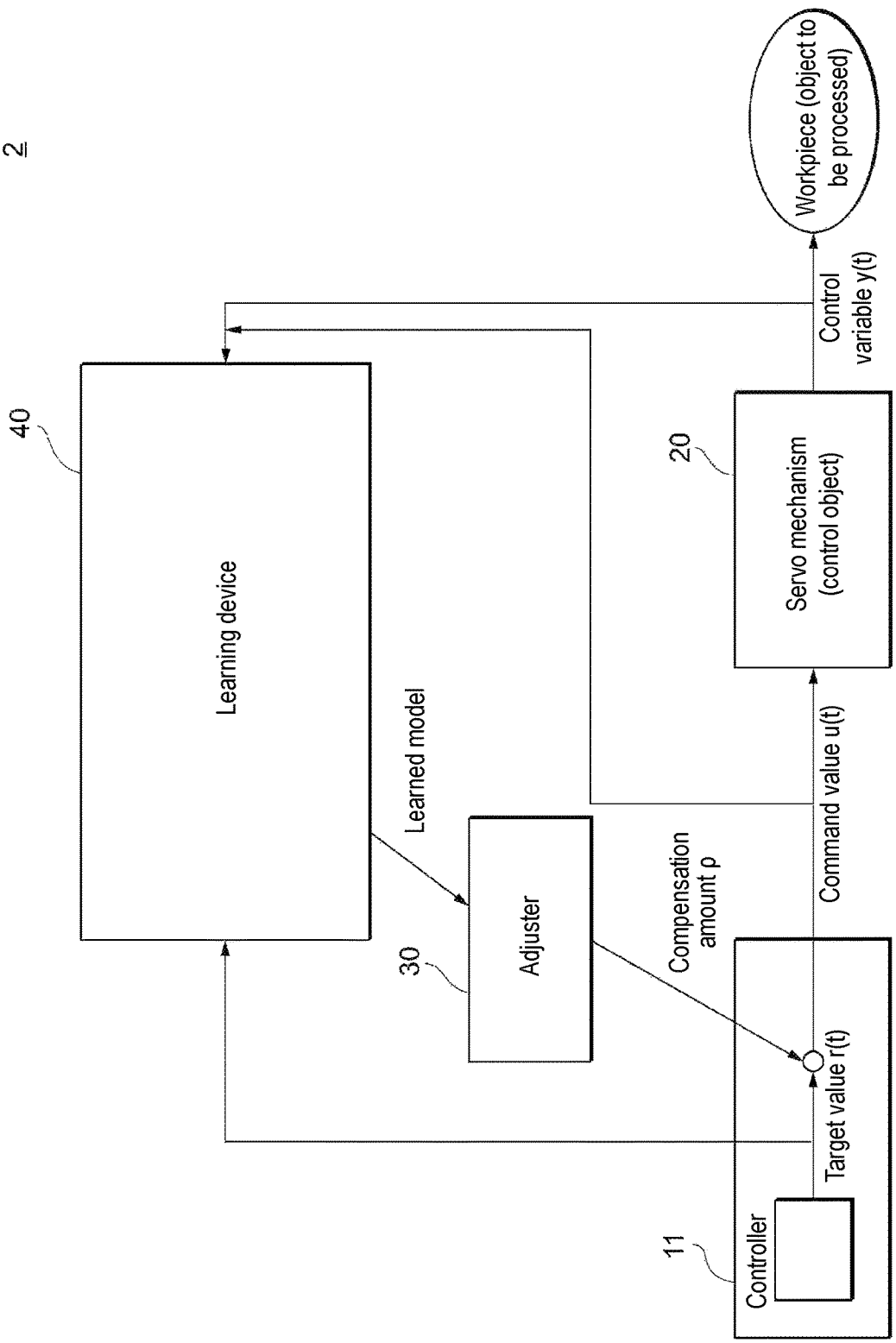
FIG. 7 is a schematic diagram showing a system configuration example of the control system according to another embodiment of the disclosure.

A configuration of a control system 2 according to another embodiment of the disclosure will be described with reference to FIG. 7. FIG. 7 is a diagram showing an example of the configuration of the control system 2. In addition, description of matters common to the above-described embodiment will be omitted, and only different points will be described. In particular, the same configurations as those described above are denoted by the same reference numerals, and the same functions and effects obtained by similar configurations will not be sequentially described for each embodiment.

The control system 2 has a controller 11 instead of the controller 10 in the control system 1. Further, the adjuster 30 inputs the compensation amount ρ to the controller 11. Other configurations and functions are similar to those of the above-described embodiment.

The controller 11 adds the compensation amount ρ input by the adjuster 30 to the generated target value r(t) to generate the command value u(t), and inputs the command value u(t) to the servo mechanism 20. That is, the calculation formula of the controller 11 is the following Equation (8).

$$u(t)=r(t)+\rho \quad \text{Equation (8)}$$

According to the controller 11, the command value may be calculated by simply adding the target value and the compensation amount without using the transfer function. In this way, it is unnecessary to design the transfer function, and it is easy to design the control model.

Although the embodiments of the disclosure have been described in detail above, the above description are merely examples of the disclosure in all aspects. It goes without saying that various improvements and modifications can be made without departing from the scope of the disclosure.

Further, in the above description, the learning device 40 has been described as a configuration for newly generating a learned model, but it may be configured to update an existing learned model. In the case of the configuration for newly generating a learned model, the learning device 40 may generate a new learned model by learning with a data set in which the currently newly generated teacher data is added to the teacher data used when the existing learned model is generated. In addition, in the case of the configuration for updating the learned model, the learning device 40 may update the learned model by performing additional learning on the existing learned model with the currently newly generated teacher data.

The whole or part of the embodiments disclosed above may be described as, but not limited to, the following appendices.

APPENDIX 1

A learning device (40) in a control system (1) which includes:
   a controller (10) which outputs a command value (u) obtained by compensating a target value (r) based on a compensation amount (ρ); and
   a control object (20) controlled to perform a predetermined process on an object to be processed, wherein a command value (u) output by the controller (10) is input to the control object (20), and the control object (20) outputs a control variable as a response to the command value (u),
   wherein the learning device (40) provides, to an adjuster (30) including a learned model learned to output the predetermined compensation amount (ρ) to the controller (10) based on a specific parameter of the object to be processed, the learned model, and
   wherein the learning device (40) includes:
   a learning part (43) which generates a candidate compensation amount (ρ*) based on operation data including the target value (r), the command value (u) and the control variable (y), performs learning with the generated candidate compensation amount (ρ*) and the specific parameter of the object to be processed as teacher data, and generates or updates a learned model; and
   a setting part (44) which provides the learned model that has been generated or updated to the adjuster (30).

APPENDIX 2

The learning device according to appendix 1, wherein the learning part generates the candidate compensation amount by data-driven control.

APPENDIX 3

The learning device (40) according to appendix 2, wherein the data-driven control is any one of virtual reference feedback tuning (VRFT), fictitious reference iterative tuning (FRIT), and estimated response iterative tuning (ERIT).

APPENDIX 4

The learning device (40) according to any one of appendices 1 to 3, wherein the learning part (43) adopts the candidate compensation amount ($\rho^*$) as the teacher data when the generated candidate compensation amount is not a value deviating by a predetermined threshold value or more from a candidate compensation amount ($\rho^*$) included in teacher data used by the learned model for learning, or when the generated candidate compensation amount is in the range of a candidate compensation amount ($\rho^*$) included in teacher data used by the learned model for learning.

APPENDIX 5

The learning device (40) according to any one of appendices 1 to 4, further including:
  an evaluation part (42) which obtains operation data including a control variable (y) when a command value (u) obtained by compensating a target value (r) based on a compensation amount ($\rho$) output by the learned model is imparted to the control object (20) to evaluate the quality of the control variable,
  wherein the learning part (43) performs the learning when the evaluation of the quality is not in an allowable range.

APPENDIX 6

The learning device (40) according to any one of appendices 1 to 5, wherein the learning part (43) performs the learning when the specific parameter of the object to be processed is a value deviating by a predetermined threshold value or more from a parameter already learned as the teacher data.

APPENDIX 7

A learning method executed in a learning device (40) in a control system (1) which includes:
  a controller (10) which outputs a command value (u) obtained by compensating a target value (r) based on a compensation amount ($\rho$); and
  a control object (20) controlled to perform a predetermined process on an object to be processed, wherein a command value (u) output by the controller (10) is input to the control object (20), and the control object (20) outputs a control variable as a response to the command value (u),
  wherein the learning device (40) provides, to an adjuster (30) including a learned model learned to output the predetermined compensation amount ($\rho$) to the controller (10) based on a specific parameter of the object to be processed, the learned model, and
  wherein the learning method is executed to make the learning device (40) perform:
    generating a candidate compensation amount ($\rho^*$) based on operation data including the target value (r), the command value (u) and the control variable (y), performing learning with the generated candidate compensation amount ($\rho^*$) and the specific parameter of the object to be processed as teacher data, and generating or updating a learned model; and
    providing the learned model that has been generated or updated to the adjuster (30).

APPENDIX 8

A program for operating a learning device (40) in a control system (1) which includes:
  a controller (10) which outputs a command value (u) obtained by compensating a target value (r) based on a compensation amount ($\rho$); and
  a control object (20) controlled to perform a predetermined process on an object to be processed, wherein a command value (u) output by the controller (10) is input to the control object (20), and the control object (20) outputs a control variable as a response to the command value (u),
  wherein the learning device (40) provides, to an adjuster (30) including a learned model learned to output the predetermined compensation amount ($\rho$) to the controller (10) based on a specific parameter of the object to be processed, the learned model, and
  wherein the program operates the learning device (40) to perform:
    a part (43) for generating a candidate compensation amount ($\rho^*$) based on operation data including the target value (r), the command value (u) and the control variable (y), performing learning with the generated candidate compensation amount ($\rho^*$) and the specific parameter of the object to be processed as teacher data, and generating or updating a learned model; and
    a part (44) for providing the learned model that has been generated or updated to the adjuster (30).

What is claimed is:

1. A control system comprises:
  a learning device;
  a controller which outputs a command value obtained by compensating a target value based on a compensation amount; and
  a servo mechanism controlled to perform a predetermined process on an object to be processed, wherein a command value output by the controller is input to the servo mechanism, and the servo mechanism outputs a control variable as a response to the command value,
  wherein the learning device provides, to an adjuster including a learned neural network model which is an artificial intelligence (AI) model learned to output the predetermined compensation amount to the controller based on a specific parameter of the object to be processed, the learned neural network model, and
  wherein the learning device comprises a processor is configured to:
    generate a candidate compensation amount for controlling the servo mechanism based on operation data including the target value, the command value and the control variable, perform learning with the generated candidate compensation amount and the specific parameter of the object to be processed as teacher data, and generate or update a learned neural network model; and
    provide the learned neural network model that has been generated or updated to the adjuster,
  wherein the processor is further configured to adopt the candidate compensation amount as the teacher data when the generated candidate compensation amount is not a value deviating by a predetermined threshold value or more from a candidate compensation amount included in the teacher data used by the learned neural network model for learning, and wherein the processor is further configured to adopt the candidate compensation amount as the teacher data when the generated candidate compensation amount is in the range of a candidate compensation amount included in the teacher data used by the learned neural network model for learning.

2. The control system according to claim 1, wherein the processor is further configured to generate the candidate compensation amount by data-driven control.

3. The control system according to claim 2, wherein the data-driven control is any one of virtual reference feedback tuning (VRFT), fictitious reference iterative tuning (FRIT), and estimated response iterative tuning (ERIT).

4. The control system according to claim 1, wherein the processor is further configured to:
obtain operation data including a control variable when a command value obtained by compensating a target value based on a compensation amount output by the learned neural network model is imparted to the servo mechanism to evaluate the quality of the control variable,
perform learning when the evaluation of the quality is not in an allowable range.

5. The control system according to claim 1, wherein the processor is further configured to perform learning when the specific parameter of the object to be processed is a value deviating by a predetermined threshold value or more from a parameter already learned as the teacher data.

6. A learning method executed in a learning device in a control system which comprises:
a controller which outputs a command value obtained by compensating a target value based on a compensation amount; and
a servo mechanism controlled to perform a predetermined process on an object to be processed, wherein a command value output by the controller is input to the servo mechanism, and the servo mechanism outputs a control variable as a response to the command value,
wherein the learning device provides, to an adjuster including a learned neural network model which is an artificial intelligence (AI) model learned to output the predetermined compensation amount to the controller based on a specific parameter of the object to be processed, the learned neural network model, and
wherein the learning method is executed to make the learning device perform:
generating a candidate compensation amount for controlling the servo mechanism based on operation data including the target value, the command value and the control variable, performing learning with the generated candidate compensation amount and the specific parameter of the object to be processed as teacher data, and generating or updating a learned neural network model; and
providing the learned neural network model that has been generated or updated to the adjuster,
adopting the candidate compensation amount as the teacher data when the generated candidate compensation amount is not a value deviating by a predetermined threshold value or more from a candidate compensation amount included in the teacher data used by the learned neural network model for learning, and
adopting the candidate compensation amount as the teacher data when the generated candidate compensation amount is in the range of a candidate compensation amount included in the teacher data used by the learned neural network model for learning.

7. A non-transient computer-readable recording medium, recording a program for operating a control system which comprises:
a learning device;
a controller which outputs a command value obtained by compensating a target value based on a compensation amount; and
a servo mechanism controlled to perform a predetermined process on an object to be processed, wherein a command value output by the controller is input to the servo mechanism, and the servo mechanism outputs a control variable as a response to the command value,
wherein the learning device provides, to an adjuster including a learned neural network model which is an artificial intelligence (AI) model learned to output the predetermined compensation amount to the controller based on a specific parameter of the object to be processed, the learned neural network model, and
wherein the program operates the learning device to perform:
generating a candidate compensation amount for controlling the servo mechanism based on operation data including the target value, the command value and the control variable, performing learning with the generated candidate compensation amount and the specific parameter of the object to be processed as teacher data, and generating or updating a learned neural network model; and
providing the learned neural network model that has been generated or updated to the adjuster,
adopting the candidate compensation amount as the teacher data when the generated candidate compensation amount is not a value deviating by a predetermined threshold value or more from a candidate compensation amount included in the teacher data used by the learned neural network model for learning, and
adopting the candidate compensation amount as the teacher data when the generated candidate compensation amount is in the range of a candidate compensation amount included in the teacher data used by the learned neural network model for learning.

* * * * *